(No Model.)

J. H. NORTON.
CULINARY UTENSIL.

No. 502,748. Patented Aug. 8, 1893.

Witnesses:
Nathan W. Perkins Jr.
Herbert S. Robinson,

Inventor:
J. H. Norton.
By Higdon & Higdon & Longan
Attys.

UNITED STATES PATENT OFFICE.

JOHN H. NORTON, OF ST. LOUIS, MISSOURI.

CULINARY UTENSIL.

SPECIFICATION forming part of Letters Patent No. 502,748, dated August 8, 1893.

Application filed May 28, 1892. Serial No. 434,758. (No model.)

*To all whom it may concern:*

Be it known that I, JOHN H. NORTON, of the city of St. Louis and State of Missouri, have invented certain new and useful Improvements in Culinary Utensils, of which the following is a full, clear, and exact description, reference being had to the accompanying drawings, forming a part hereof.

My invention relates to improvements in "culinary utensils" and consists in the novel arrangement and combination of parts as will be more fully described and designated in the claims.

Figure 2:
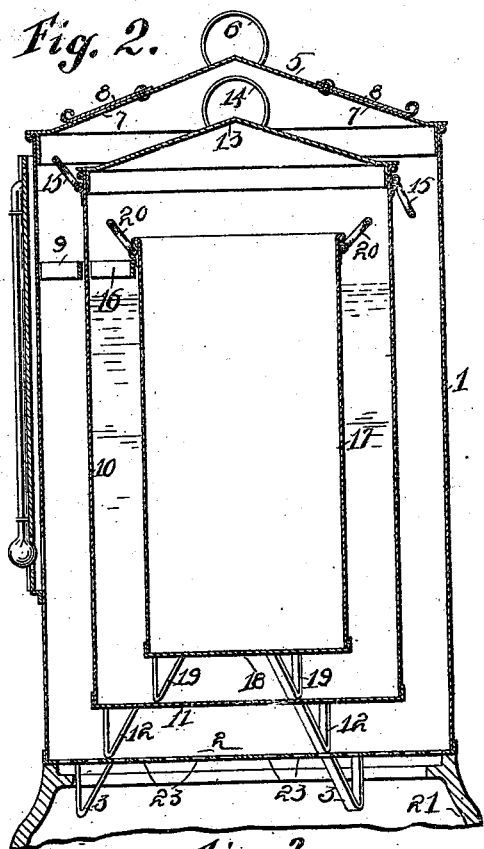
Figure 1:
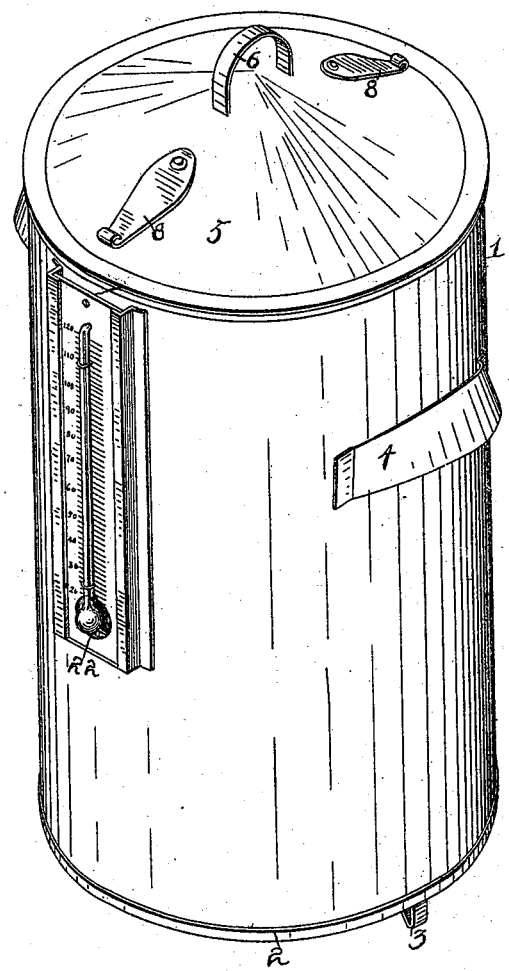
Figure 3:
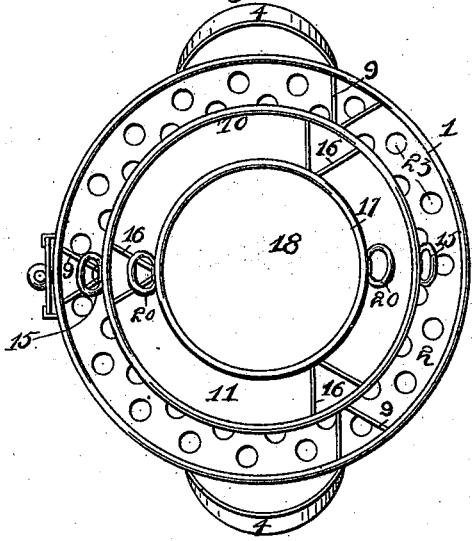

In the drawings: Figure 1 is a perspective view of my complete invention. Fig. 2 is a vertical sectional view showing in detail the parts of my invention. Fig. 3 is a top plan view of my invention with the covers of the various receptacles removed.

The object of my invention is to construct a device in which to facilitate and insure the mixture of yeast for bread making. The yeast before being mixed with the flour or other bread stuffs has to go through a process and be raised to a certain temperature. This temperature also has to be reached very slowly to prevent burning or otherwise injuring its properties.

My principal object has been to construct this utensil combining a safe manner of arriving at the necessary temperature and also, to provide means by which the person using the utensil can tell when the yeast has reached its proper condition.

Referring to the drawings, 1 represents an outer receptacle preferably made of tin and provided with a reticulated bottom 2, said bottom having depending standards or legs 3. These standards are approximately V-shaped in cross section, said standards being made of one piece of metal bent in said shape with its free ends secured to the bottom 2 of the receptacle 1. The receptacle 1 is also provided with lifting handles 4 and a removable lid 5, also provided with a lifting handle 6, said lid being of a conical shape for a purpose hereinafter described.

The lid 5 has several vent holes 7 covered by adjustable valves 8, to allow the outlet of steam if deemed necessary by the operator.

The inside of the receptacle 1 is provided with projecting standards or gages 9 similar in shape and construction to the standards 3 and placed in a relative triangular position with each other. These standards or gages 9 hold in place a receptacle 10, having an imperforate bottom 11 provided with standards 12 similar to those on the bottom 2 of the receptacle 1 and adapted to keep said receptacle 10 elevated above the bottom of the receptacle 1. Said receptacle 10 is provided with a lid 13, a handle 14 to said lid and the side of said inner receptacle provided with lifting handles 15. The shape of this lid 13 is similar to that of the lid 5 and is adapted to fit relatively into said lid. The inner receptacle 10 is provided on its inner wall with projecting gages 16, similar to those in the receptacle 1. Fitting into these gages is another receptacle 17 having an imperforate bottom 18, and standards 19 similar in construction and design to the standards 3 and 12 and serving the same function, depending therefrom and secured thereto. This receptacle is not provided with a lid, for purpose more fully hereinafter described. This receptacle is provided with lifting handles 20 by means of which it is lifted out of the receptacle 10.

It will be seen by referring to Fig. 2 that each receptacle fits within the other and in a relative position from each other.

The receptacle 1 is adapted to fit into the top of a steaming vessel 21 and is held in a rigid position therein by the standards 3 engaging against the sides of said vessel 21. Secured upon the side of said receptacle 1 and near the top of same is a thermometer or temperature indicator 22 by means of which the operator can ascertain the temperature of the ingredients.

Having fully described the construction and briefly stated the object of my invention, I will now proceed to describe its operation.

The complete apparatus comprising my invention is placed upon the top of the steaming vessel as shown in Fig. 2, and the steam arising therefrom passes through the perforations 23 in the bottom 2 of the outer receptacle. The receptacle 10 is filled with lukewarm water, which as the steam surrounds it in the space between its outer periphery and the wall of the outer receptacle 1 becomes gradually heated, thus materially assisting in the raising of the yeast which is placed in the innermost receptacle 17, which is in position relatively within the receptacle 10. It will be readily perceived that the gradual raising of the temperature does not affect the condition of the yeast unless such temperature is allowed to become too high. A minimum temperature having been established, the operator can remove the device from over the steaming vessel, when the temperature as indicated by the thermometer provided for that purpose has become sufficient. If the steam pressure is too heavy, the vent holes 7 allow the steam to escape after the valves 8 have been opened.

Having fully described my invention, what I claim is—

In a culinary utensil, the combination, with an outer receptacle having a reticulated bottom, and provided with a cover, of an imperforate receptacle disposed therein and provided with a cover said receptacle being adapted to contain a heat absorbing substance, a second imperforate receptacle disposed in said imperforate receptacle, and means for retaining each interior receptacle elevated above the bottom of the inclosing receptacle and free from contact with the sides of the latter; substantially as and for the purpose set forth.

In testimony whereof I affix my signature in presence of two witnesses.

JOHN H. NORTON.

Witnesses:
HERBERT S. ROBINSON,
ALFRED A. EICKS.